Dec. 14, 1971

S. E. KALEN 3,626,560

SIZING AND FINISHING DEVICE FOR EXTERNAL SURFACES

Filed June 4, 1970

INVENTOR.
Stuart E. Kalen
BY
Harness, Dickey & Pierce
ATTORNEYS.

Dec. 14, 1971     S. E. KALEN     3,626,560

SIZING AND FINISHING DEVICE FOR EXTERNAL SURFACES

Filed June 4, 1970     4 Sheets-Sheet 2

INVENTOR.
Stuart E. Kalen
BY
Harness, Dickey & Pierce
ATTORNEYS

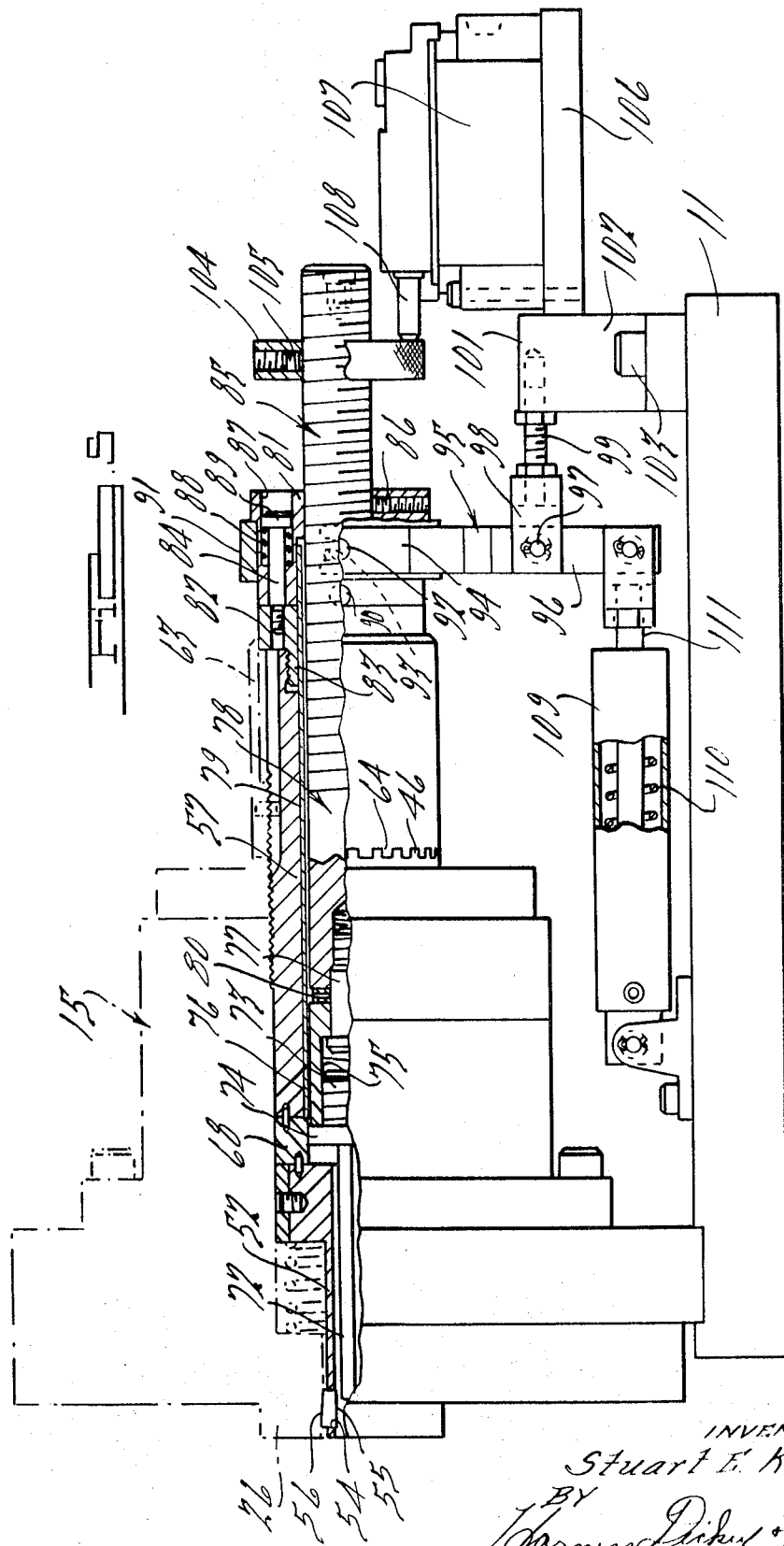

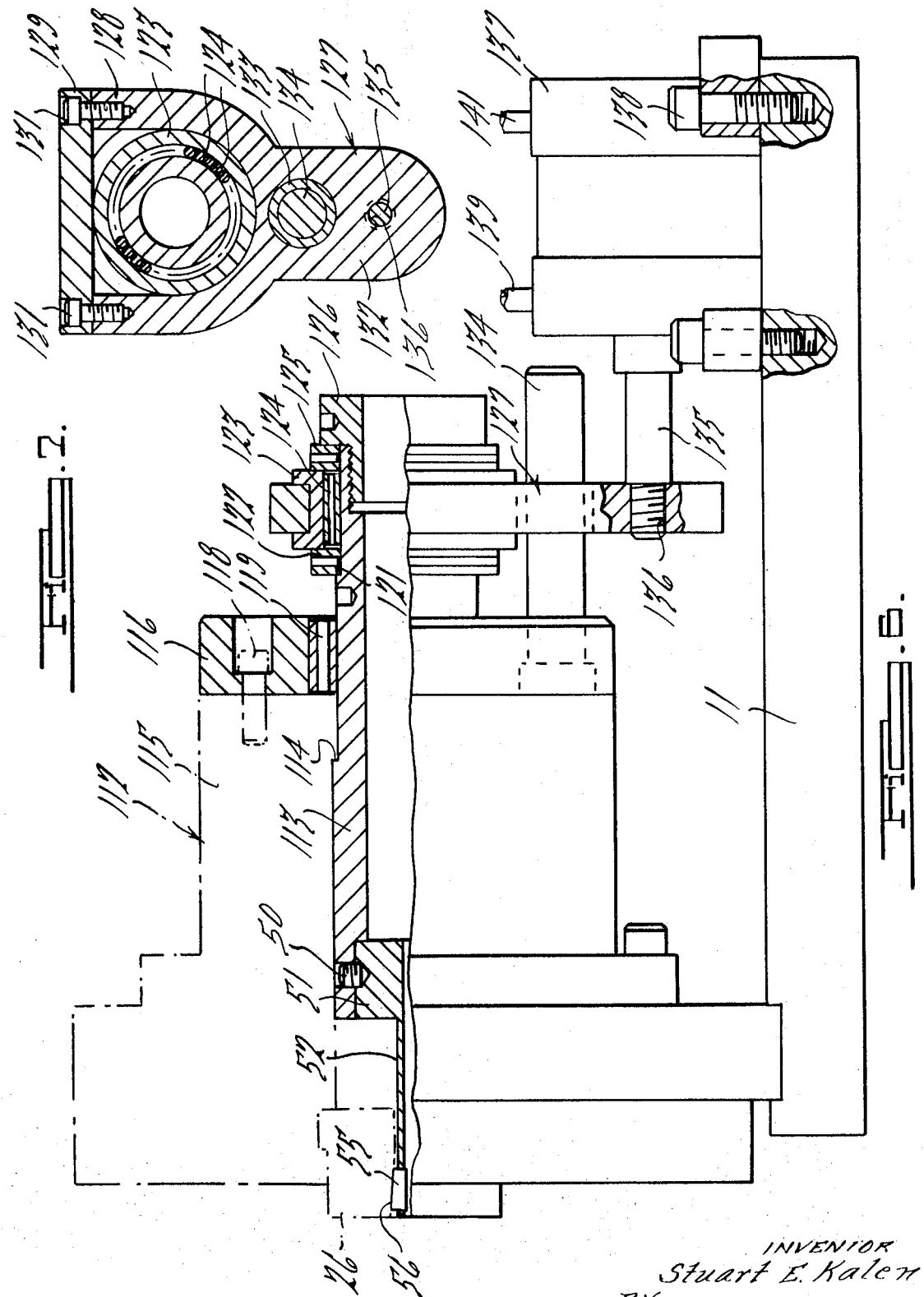

United States Patent Office 3,626,560
Patented Dec. 14, 1971

3,626,560
SIZING AND FINISHING DEVICE FOR
EXTERNAL SURFACES
Stuart E. Kalen, Sterling Heights, Mich., assignor to
Cogsdill Tool Products, Inc.
Filed June 4, 1970, Ser. No. 43,390
Int. Cl. B21c 37/30; B24b 39/00
U.S. Cl. 29—90   10 Claims

ABSTRACT OF THE DISCLOSURE

The self-contained device produces relative rotation between a workpiece, truncated conical rollers and a head having a truncated conical surface. The rollers are adjustable to fall on a desired diameter for sizing and/or finishing the external surface of a cylindrical workpiece by a burnishing operation. By tilting the rollers relative to the axis of the tool, a feed occurs which advances the workpiece through the burnishing rollers. Manual or power operated members adjust the roller carrier and head relative to each other lengthwise of the tool for positioning the rollers for the sizing and/or finishing operation and for releasing the workpiece after the burnishing operation and when desirable for receiving a new workpiece after which the rollers are returned to the set working diameter.

BACKGROUND OF THE INVENTION

Reference may be had to the patent to W. G. Huber et al., No. 3,320,652, issued May 23, 1967, for "Burnishing Tool" which was assigned to the assignee of the present invention.

SUMMARY OF THE INVENTION

The invention pertains to a self-contained device having a base which supports an upright on which a burnishing tool is mounted along with the motor and drive means for the tool providing a compact unit. A cage having a plurality of elongated apertures contain truncated conical rollers which engage a truncated conical surface of an aperture in a head at the work receiving end of the device. The truncated conical rollers are of one-half the slope as that of the aperture in the head with which they engage so as to have the inner edges disposed parallel to each other and the axis of the cage in position to engage a cylindrical workpiece. The head is driven by suitable means, either by engaged gears or aligned spaced pulleys and a belt which is sealed within a chamber provided therefor.

An outer cylindrical housing is supported on the forward face of the upright having roller bearings therein which engage a spindle body which is driven with the head by the belt or gear drive. A flange for securing an adjusting sleeve is attached to the outer end of the housing having notches which mates with notches on an adjustable collar which moves the cage and rollers axially along the tapered surface of the head to change the diameter of the work receiving opening within the rollers. This adjustment of the collar can be effected while the head and spindle body are being rotated.

The interior of the tool is hollow and a long rodlike workpiece may pass therethrough while being burnished to size and finished the entire length or spaced sections thereof. The workpiece may also be burnished and stop means provided actuated by the workpiece at the end of the burnishing operation for producing the tripping of a microswitch, valve or the like to operate a device for retracting the cage and rollers and releasing the workpiece and returning the cage and rollers to the internally selected positioning thereafter. It is also within the purview of the invention to apply force on the cage by a pressure operated device for loading the rollers or for adjusting the cage to a predetermined position for producing the burnishing operation and for retracting the cage and releasing the work thereafter.

BRIEF DESCRIPTION OF THE DRAWINGS

FIG. 5 is a view of structure, similar to the illustration in FIG. 1, showing another form of the invention, and FIG. 6 is a view of structure, similar to that illustrated in FIG. 1, showing still another form of the invention.

Figure 1:
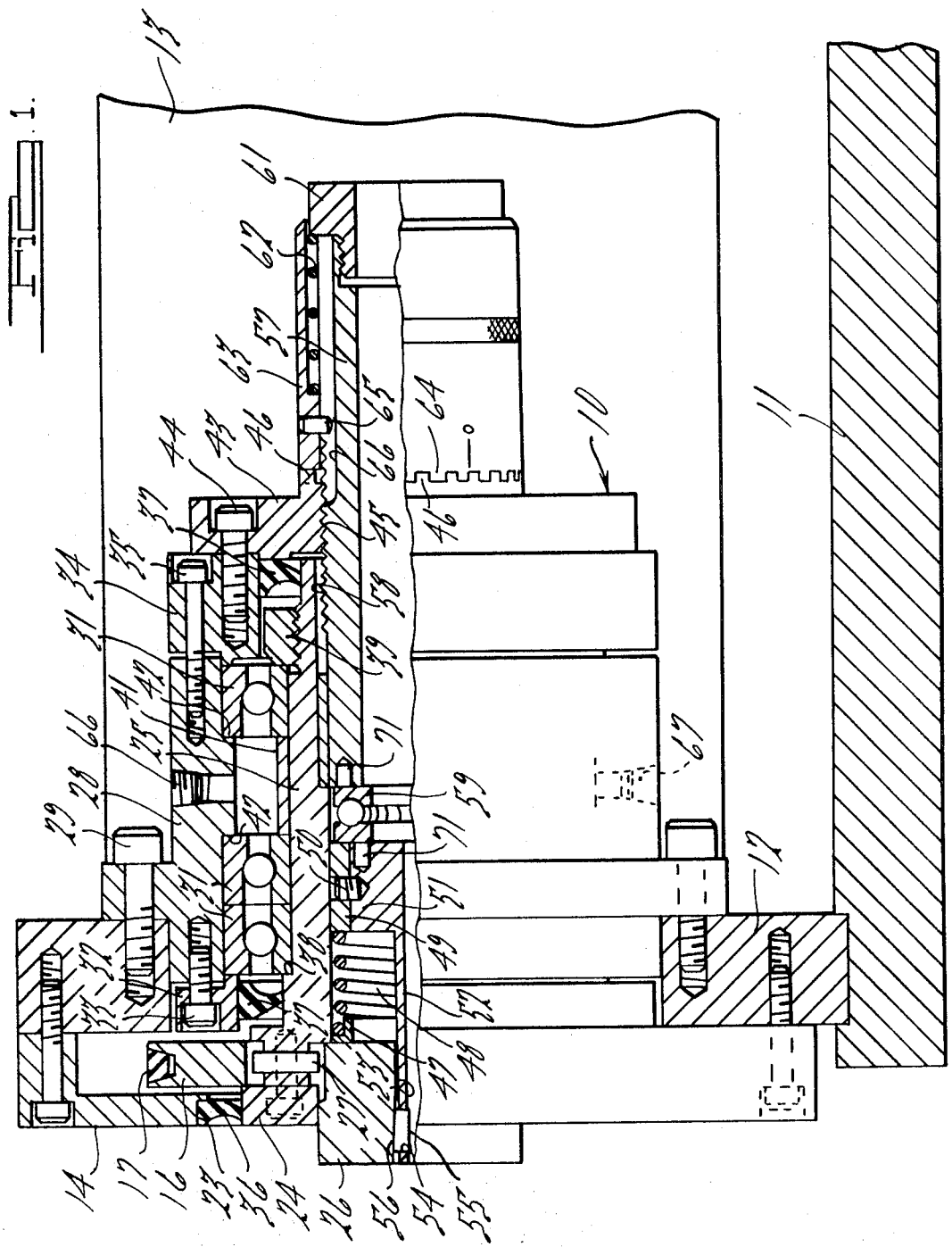
FIG. 1 is a broken sectional view in elevation of the device embodying the present invention.
Figure 2:
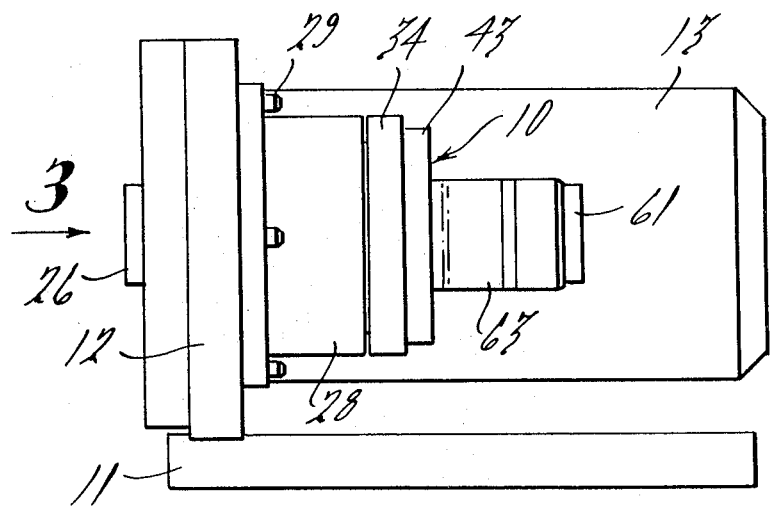
FIG. 2 is a reduced side view of the device illustrated in FIG. 1.
Figure 3:
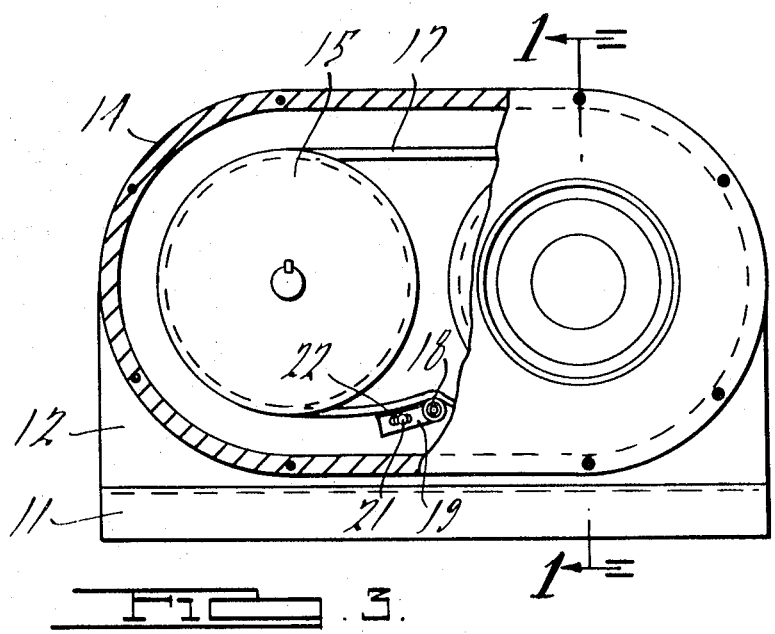
FIG. 3 is a broken sectional view of the structure illustrated in FIG. 2, as viewed from the end 3 thereof.

DESCRIPTION OF THE PREFERRED
EMBODIMENTS

The burnishing device 10 has a base 11, an upright 12 which supports the burnishing device 10 and a motor 13. The upright 12 supports a cover 14 for a drive which herein is illustrated as a pair of pulleys 15 and 16 interconnected by a belt 17. A tension is maintained on the belt 17 by a bearing 18 which engages the outer face thereof and which is mounted on an adjustable plate 19 which is locked in adjusted position by a screw 21 disposed in a slot 22 in the plate. In place of the pulleys 15 and 16 a pair of gears having teeth in engagement with each other can be substituted therefor. The cover 14 has a central aperture 23 with which a ring 24 is aligned when secured on the end of a sleevelike spindle 25. The pulley 16 is secured to the spindle and to a head 26 by a key 27. The pulley drives the spindle 25, the ring 24 and the head 26 as a unit. A hollow cylindrical housing 28 is secured to the front face of the upright 12 by a plurality of screws 29.

Thrust-type ball bearings 31 are mounted between the inner face of the housing 28 and the outer face of the spindle 25 to permit the spindle to rotate within the housing. The outer race of the bearings is maintained in position against shoulders 42 of the housing 28 by a ring 32 secured by screws 33 to the rear end of the housing 28 and by a ring 34 secured by screws 35 at the front end thereof. The inner race of the bearings 31 is clamped between a shoulder 38 at the left hand end of the spindle 25, a sleeve 41 and a nut 39 threaded on the forward end of the spindle 25.

A seal 36 seals the opening between the ring 24 and the wall of the aperture 23 in the cover 14 while seals 37 seal the spindle 25 to the rings 32 and 34. A locking plate 43 is secured on the front face of the ring 34 by a plurality of screws 44. The plate has an internal thread 45 and an annular forward edge containing a plurality of notches 46. An annular L-shaped spring retainer 47 preferably made of bronze abuts against the inner face of the head 26. The adjacent end turn of a coil spring 48 is recessed within the retainer 47, the turn on the opposite end engaging a bronze sleeve 49 which is secured by a setscrew 50 to the outer surface of the enlarged end 51 of a sleevelike cage 52. The end of the cage is located within an aperture 53 in the head 26 and is provided with tapered slots 54 for supporting a plurality of truncated conical rollers 55. One edge of the slot is beveled to provide a slot width less than the diameter of the rollers to prevent them from passing therethrough into the interior of the cage while permitting a desired radial movement thereto. The end section 56 of the aperture 53 is of truncated conical shape of twice the angle of slope as that of the rollers 55 to have the inner edge of the rollers parallel to each other and the axis of the cage 52. A hollow shank 57 has a thread 58 in engagement with the threads 45 on the plate 43 with the left hand end engaged by a thrust roller bearing 59 which abuts the sleeve 49 and the enlarged end 51 on the cage 52 between which a pressure is exerted by the spring 48. The forward end of the shank 57 has a sleeve 61 threaded thereinto which is in engagement with a coil spring 62 which urges an adjusting sleeve 63 forward to have the notches 64 on its inner end disposed in engagement with the notches 46 on the plate 43 to lock the sleeve 63 from turning. The sleeve 63 has a pin 65 therein which extends into a slot 66 in the shank 57. When the sleeve 63 is pulled outwardly against the tension of the spring 62 releasing the notches 64 from the notches 46, the turning of the sleeve rotates the shank 57 and moves it toward or away from the head 26 depending upon which direction the sleeve is rotated. After the longitudinal adjustment of the cage 52 in this manner, the release of the sleeve 63 permits the spring 62 to move it forwardly to have its notches 64 again engage the notches 46 to maintain the adjustment. The inner and outer movement of the shank 57 moves the cage 52 therewith to thereby locate the rollers 55 longitudinally of the engaged sloping surface 56 of the head 26.

The motor 13 drives the head 26 and the spindle 25 in rotation while the cage 52 is rotated by the rollers 55. This is made possible by the use of the bearings 31 and 59. This rotation of the head 26 drives the rollers 55 through the engagement thereof with the sloping surface 56 causing the rollers to rotate the cage 52 independently of the rotation of the head 26. The parallel inner edges of the rollers are in engagement with the workpiece which is driven in rotation therewith and compacts the surface thereof by the pressure engagement therewith. A single pass of the workpiece past the rollers 55 produces a microfinish on the surface and when the rollers are set at a predetermined position along the sloping surface 56 a predetermined diameter can be provided along with the finished surface. The rollers 55 can be set at a slight angle to the axis of the cage for the purpose of producing a feed movement to the workpiece which will be advanced through and beyond the rollers 55. It will be noted that the cage 52 is hollow as well as the shank 57 and a sleeve 61 so that a workpiece of any length can be fed through the device to size and/or finish the surface thereof. As pointed out above, an outward pulling on the sleeve 63 against the tension of the spring 62 releases the notches 64 from the notches 46 to permit the sleeve and the shank 57 to be rotated to advance or retract the cage 52 to enlarge or decrease the diameter which will be produced by the rollers 55 on the workpiece surface. When the rollers are moved toward the outer end of the head 26 where the slope 56 has a greater diameter, a greater diameter will be provided on the workpiece. When the rollers are moved inwardly of the head 26, the adjustment of the rollers along the portion of the slope 56 having the least diameter will reduce the diameter to which the workpiece will be burnished. A lubricating material may be supplied to the interior of the housing 28 through an intake aperture 66 and may be drained therefrom through a drain aperture 67.

Figure 4:
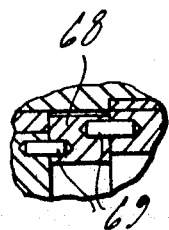
FIG. 4 is a broken modified view of the structure illustrated in FIG. 1.

As illustrated in FIG. 1, a bearing 59 is provided between the large end 51 of the cage and the spindle 57 to permit relative rotation therebetween. When the cage is to be fixed against rotation the bearing 59 is omitted and a ring 68, illustrated in FIG. 4, is substituted therefor having pins 69 which extend into apertures 71 in the ends of the shank 57 and the enlarged end 51 of the cage 52. With this arrangement, the rollers 55 are rotated by the driving of the head within the apertures of the nonrotating cage 52 and the workpiece is rotated by the rollers as it is fed through the device to have the rollers produce the sizing and finishing or a finishing operation thereon. It is also within the purview of the invention to drive the workpiece in rotation while it is being fed past the rollers 55.

Referring more specifically to FIG. 5, the burnishing device 11 is constructed to have the sizing and/or finishing operation completed by the advancement of the workpiece and the engagement with a stop element 72. The stop element has a threaded boss 73 and a stop flange 74 thereon which is threaded into a threaded aperture 75 in a cuplike element 76. A shouldered screw 77 passing through the bottom of the cuplike element 76 is threaded into the end of a rod 78. A thrust bearing 80 is positioned between the cuplike element 76 and the rod 78 to permit relative rotation therebetween. The shank 57 is adjusted longitudinally by the rotation of the sleeve 63 after the notches 64 are disengaged from the notches 46 upon the outward movement of the sleeve. A sleeve 79 extends from the ring 68 to within a recessed end of an internally threaded collar 81 which is movably secured to a ring 82 by a plurality of screws 84. The ring 82 has a threaded shoulder end 83 secured onto the threaded end of the shank 57. The rod 78 has its end 85 provided with a thread in engagement with a thread within the collar 81 in which it is rotated to adjust the rod longitudinally and secured in adjusted position by a set screw 86. The apertures in the collar 81 for the screws 84 are enlarged to form recesses 87 which receive the heads 89 of the screws 84. Springs 88 have one end in engagement with the heads 89 and the opposite end in engagement with the bottom of the recesses 87. This permits the collar 81 and rod 78 to move outwardly independently of the ring 82 and shank 57.

A sleeve 91 is provided on the collar 81 having a pair of diametrically aligned pins 92 extending outwardly therefrom. The pins are nested in slots 93 in the arms 94 of a Y-shaped yoke 95 having its downwardly extending end 96 secured by a pivot 97 to a bifurcated element 98 which is adjustably supported by a screw 99 on an upwardly extending section 101 of a T-shaped block 102 which is secured by screws 103 to the base 11. The threaded end 85 of the rod 78 has a collar 104 threaded thereon which is accurately adjusted therealong and secured in adjusted position by a set screw 105. A base 106 is supported on the extending section 101 of the T-shaped block 102 with a switch, valve 107 or other actuating element thereon which is operated by a plunger 108 upon the advancement of the collar 104. The engagement is such that a movement of the collar 104 to the right moves the plunger 108 therewith a small amount sufficient to trip the switch or operate the valve 107 and energize the solenoid or a ram, the latter being herein illustrated. Fluid flowing into the ram moves the piston rod 111 thereof outwardly to move the arms 94 of the yoke 95 to the left with the sleeve 91 in engagement with diametrically disposed pins 90 extending from the sleeve 79. This moves the sleeve 79 and the cage 52 to the left thereby extending the cage and releasing the rollers 55 permitting the workpiece to fall from or otherwise be removed from the device. The workpiece is being sized and/or finished by the rollers on a determined diameter obtained by adjusting the cage 52 longitudinally to position the rollers 55 at a desired point on the sloping surface 56 of the head 26. This is accompanied by the rotation the rod 78 within the thread of the collar 81 to shift the cage 52 longitudinally. The collar 104 is then adjusted on the rod 78 relative to the plunger 108 to have it operate the valve 107 when the end of the stop element 72 is engaged by the workpiece at the end of the burnishing operation thereon. The stop element 72 is advanced to move the rod 78 and produce the operation of the plunger 108. Upon the application of the fluid, such as air to a ram 109, the rollers 55 are extended permitting the workpiece to be removed. The air is relieved from the ram 109 manually or automatically to permit a spring 110 within the ram to return a piston rod 111 to the position illustrated in FIG. 5 readily for the next operation. The rod 78 is advanced independently of the spindle 57 and ring 82 by the movement of the collar 81 on the screws 84. During this advancement the springs 88 are compressed and after the tripping operation and the release of the workpiece, the springs return the collar 81 to the position illustrated. The stop element 72 may be of different lengths conforming to the lengths of the workpiece for accurately positioning the end of the stop element relative to the inner end of the workpiece.

A further form of the invention is illustrated in FIG. 6. A burnishing device 112 has a retractable shank 113 for the cage 52 which has its enlarged end 51 secured thereto by a plurality of set screws 50. The cage and shank are limited in movement to the right by the engagement of a shoulder 114 with a shoulder within a housing 115. A face plate 116 is secured to the end of the housing by a plurality of screws 118 in engagement with a roller bearing 119 which is in engagement with the outer surface of the shank 113. The forward end of the shank 113 has a shoulder 121 against which a thrust bearing 122 abuts when engaging a recessed ring 123 which engages a roller bearing 124 carried by the shank 113. A thrust bearing 125 is disposed between the ring 123 and a locking collar 126 threaded into the internal thread of the shank 113.

A yoke 127 has upwardly extending arms 128 disposed within the channel recess of the ring 123 in which it is retained by a bar 129 secured on the ends of the arms by screws 121. The downwardly extending portion 132 of yoke 127 is provided with a sleeve bearing 133 which receives a guide bar 134 extending forwardly from the bottom of the plate 116. A piston rod 135 has its end threaded into a threaded aperture 136 at the extending portion 132 of the yoke 127. The piston rod extends from a fluid operated ram 137 which is secured by screws 138 to the base 11 of the device. The workpiece is burnished by the rollers 55 when driven in rotation by the sloping surface 56 within the driven head 26 as the cage 52 and shank 113 are rotated thereby. It is within the purview of the invention to drive and feed the workpiece through the rollers when head 26 is driven. During the machining operation pressure may be applied to the rollers 55 through the operation of the piston rod 135 by the fluid admitted to the ram 137. The reverse application of the fluid to the ram removes the pressure from the rollers 55 and permits the workpiece to be withdrawn. The fluid is admitted to and withdrawn from the ram through the ports 139 and 141. The operation of the ram 137 moves the shank 113 axially to move the cage 52 therewith for positioning the rollers 55 to produce sizing or to produce a heavy pressure to the surface thereof resulting in a greater crushing of the rough surface of the workpiece to produce a fine microfinish thereon and increase the hardness of the surface thereof. When the piston rod 135 is moved outwardly of the ram, the rollers 55 are moved to retracted position to release the workpiece.

I claim:

1. In a self-contained burnishing device, a base, an upright on said base for supporting a burnishing tool and a driving motor on the forward face thereof overhanging said base, said burnishing tool having a head on the center thereof containing an axially disposed truncated conical aperture, a hollow spindle fixed to said head for rotation therewith, a housing extending forwardly of said upright, bearing means between said housing and said spindle, a hollow cylindrical cage within said head and spindle containing a plurality of elongated slots located within said head, truncated conical rollers confined within said slots with the inner edge of the rollers substantially parallel to each other and the axis of the tool, and a hollow shank for moving said cage axially for positioning said rollers relative to said truncated conical surface within said head for changing the radial position of the rollers.

2. In a burnishing device as recited in claim 1, wherein a thrust washer is provided between said cage and said shank to permit the rotation of the former relative to the latter.

3. In a burnishing device as recited in claim 1, wherein a ring is provided between said cage and said shank, and means for fixing the adjacent faces of said ring to the engaged faces of said cage and shank to prevent any relative rotation therebetween.

4. In a burnishing device as recited in claim 1, wherein the parallel inner edges of the rollers are at a slight angle to each other to provide a feed to the workpiece which is advanced through the rollers thereby.

5. In a burnishing device as recited in claim 1, wherein the motor and housing are disposed in side by side relationship, and drive means between the motor and head by which the head is driven in rotation.

6. In a burnishing device as recited in claim 1, wherein a sleeve is provided on said shank releasably secured to said housing, and means permitting the release of said sleeve while maintaining a driving relation with said shank for producing its rotation when the sleeve is rotated.

7. In a burnishing device as recited in claim 3, wherein a stop element is provided on the axis of the head in position to be engaged by the advancing workpiece, and means actuated upon said advancement for retracting said cage and moving the rollers outwardly from the workpiece which is released thereby.

8. In a burnishing device as recited in claim 7, wherein said actuated means embodies an axially movable elongated element which is adjustable axially for locating the end of the stop element relative to the rollers, an adjustable collar on said elongated element, a plunger engageable by said adjustable collar, and a device actuated upon the operation of the plunger for retracting said shank and moving the elongated and stop elements and the cage in a direction to extend the rollers and release the workpiece.

9. In a burnishing device as recited in claim 8, wherein said elongated and stop elements are moved outwardly to operate the plunger independently of said cage and shank.

10. In a burnishing device as recited in claim 1, wherein the shank for adjusting the cage has a collar thereon, a yoke secured to said collar, a guide rod supporting said yoke, and a ram for moving said yoke, shank and cage in one direction for releasing said rollers and in the other direction for applying a substantial pressure thereto.

References Cited
UNITED STATES PATENTS

| | | | |
|---|---|---|---|
| 3,320,652 | 5/1967 | Huber | 29—90 |
| 3,140,529 | 7/1964 | Rozentals | 29—90 |
| 3,350,762 | 11/1967 | Koppelmann | 29—90 |
| 2,843,918 | 7/1958 | Koppelmann | 29—90 |
| 2,874,452 | 2/1959 | Thompson | 29—90 |

HARRISON L. HINSON, Primary Examiner

U.S. Cl. X.R.

72—126